United States Patent [19]

Wyvill

[11] 4,090,083

[45] May 16, 1978

[54] NUCLEAR REACTOR EX-CORE STARTUP NEUTRON DETECTOR

[75] Inventor: Jeffrey Roland Wyvill, South Windsor, Conn.

[73] Assignee: Combustion Engineering, Inc., Windsor, Conn.

[21] Appl. No.: 732,518

[22] Filed: Oct. 14, 1976

[51] Int. Cl.[2] .................................................. G01T 3/06

[52] U.S. Cl. ..................................... 250/390; 250/361; 250/368; 250/518

[58] Field of Search ................ 250/361, 368, 362, 390, 250/391, 392, 515, 518

[56] References Cited

U.S. PATENT DOCUMENTS

| | | | |
|---|---|---|---|
| 2,747,105 | 5/1956 | Fitzgerald et al. | 250/518 |
| 2,799,780 | 7/1957 | Ruderman | 250/390 |
| 3,032,659 | 5/1962 | Bacon et al. | 250/361 |
| 3,707,631 | 12/1972 | Untermyer | 250/390 X |
| 3,892,971 | 7/1975 | Arthur et al. | 250/368 X |

OTHER PUBLICATIONS

Neutron Detectors, Glass Detectors, Nuclear Enterprises Inc. Document, Apr. 21, 1975, 7 pages.

*Primary Examiner*—Archie R. Borchelt
*Attorney, Agent, or Firm*—Bean, Kauffman & Bean

[57] ABSTRACT

A scintillation type neutron detector is provided herein for the measurement of neutrons with optimum neutron sensitivity and minimum gamma sensitivity. A large diameter nuclear radiation insensitive photomultiplier tube is optically connected to a scintillating medium which is responsive to thermalized neutrons. The neutrons available for detection are thermalized by a neutron moderating material adjacent to the scintillator medium. Enclosing and shielding the photomultiplier, the scintillator medium, and the moderator is a combined lead and borated silicone resin housing.

20 Claims, 2 Drawing Figures

42
40
2
10
2
46
48
50
44

40
10
22
16
42
14
32
30
12
28
26
18
24
20
38
34
36

NUCLEAR REACTOR EX-CORE STARTUP NEUTRON DETECTOR

BACKGROUND OF THE INVENTION

This invention relates to the accurate and sensitive measurement of small neutron fluxes existing on the exterior of a nuclear reactor during reactor start up. More specifically, the invention relates to a scintillation type neutron detector having maximum resistance to detector sensitivity degradation in high radiation flux environments.

In order to accurately monitor and control the start up of the nuclear reactor, some means must be devised to monitor the power level achieved by the reactor during start up. Since reactor power is always proportional to neutron flux levels, rapidly responding neutron detectors are desirable for this application. Detectors located outside the pressure vessel are preferred since they are not subject to limitations of space existing within the core, and because less hostile environmental conditions (radiation levels four magnitudes lower and ambients at least several hundred degrees cooler) assure longer instrument lifetimes with adequate accuracy and reliability. The prior art has heretofore commonly used $B^{10}$ and $BF_3$ ex-core start up detectors located in detector wells formed in the biological shield adjacent to the reactor pressure vessel. These ex-core start up detectors have exhibited an unacceptable failure rate primarily due to high gamma radiation levels and high neutron radiation levels which can vary by as much as 10 to 12 orders of magnitude between reactor start up and peak power. The power levels themselves extend from zero to perhaps twice the full rated range.

With current technology, no single instrument channel can provide satisfactory control over such an extensive range. Therefore, the usual approach is to divide the complete range of measurement into three separate, smaller ones, with a certain amount of overlap between adjacent ranges. At the bottom of the scale is the "source range" of control. With a reactor in the quiescent state, before being started, the rate of spontaneous fission among the uranium atoms is barely perceptible if no external neutron stimulus is present. If the configuration of fuel assemblies plus control rods is such that a single entering neutron could trigger a rapid chain reaction, anticipation and prevention of uncontrolled onset of criticality would be very difficult. To avoid this possibility, a neutron source is installed in the reactor and kept there at all times; this assures a measurable count, even when the reactor is in the safe shutdown condition.

Over the entire "source range," neutron production rates are so small that they are measured in terms of individual neutron pulses, and meter display is in counts per second. The range covers five to six decades of neutron pupulation, or reactor power. At the low end, safety dictates measured count rates of one to ten counts per second. Thus, an extremely sensitive neutron detector is desirable. In addition, the upper limit of the range depends on the ability of a detector and its circuitry to discriminate discrete neutron pulses without saturating.

Within a short time following a reactor shutdown, gamma ray flux levels due to prior operation can be sizeable, even though neutron population may be quite low. Therefore, care must be exercised in discriminating between counts resulting from actual neutron population and counts resulting from a phenomenon called "gamma pile up" in which two or more gamma rays activate the detector at the same time with the result that a pulse having a magnitude equal to the sum of a number of gamma pulses is generated.

Typically, gamma pulses are discriminated from neutron pulses by pulse size. The neutron count rate may be masked, however, by this phenomenon of "gamma pile up" if the size of the neutron generated pulse is not greatly different from the pulse occurring from "gamma pile up." If "gamma pile up" were to result in a noticeable meter reading while the reactor was being restarted within a short time following reactor shutdown, it could mask the true rate of buildup of neutron activity, leading the operator to underestimate the proximity to criticality. Thus, source range detectors must have high sensitivity to neutrons as well as the ability to discriminate between neutron pulses and gamma causes pulses in the presence of a strong background of gamma radiation.

Accordingly, a neutron ex-core start up detector having a high neutron sensitivity and a low gamma sensitivity is desirable. This start up detector additionally should have the ability to withstand very high gamma and neutron fluxes without exhibiting excessive degradation in detector sensitivity.

SUMMARY OF THE INVENTION

In response to the desirability of an extremely sensitive ex-core neutron start up detector which has the capability of being exposed to high gamma and neutron fluxes without significant detector degradation, a new scintillation type ex-core start up detector has been developed. The neutron detector of the present invention utilizes a radiation insensitive photomultiplier tube specifically designed to withstand the high radiation fluxes of the nuclear reactor environment. The photomultiplier tube receives photons emanating from a scintillation crystal responsive to thermalized neutrons. A neutron thermalizer is provided to moderate the fast neutrons available in the reactor environment. The photomultiplier tube is protected in other directions from fast neutrons by a neutron absorber shield consisting of a borated silicone resin. The neutron thermalizer medium combination is encased within a lead shield which is provided for the purpose of preventing gamma ray damage to the photomultiplier combination.

DESCRIPTION OF THE PREFERRED EMBODIMENT

Figure 1:
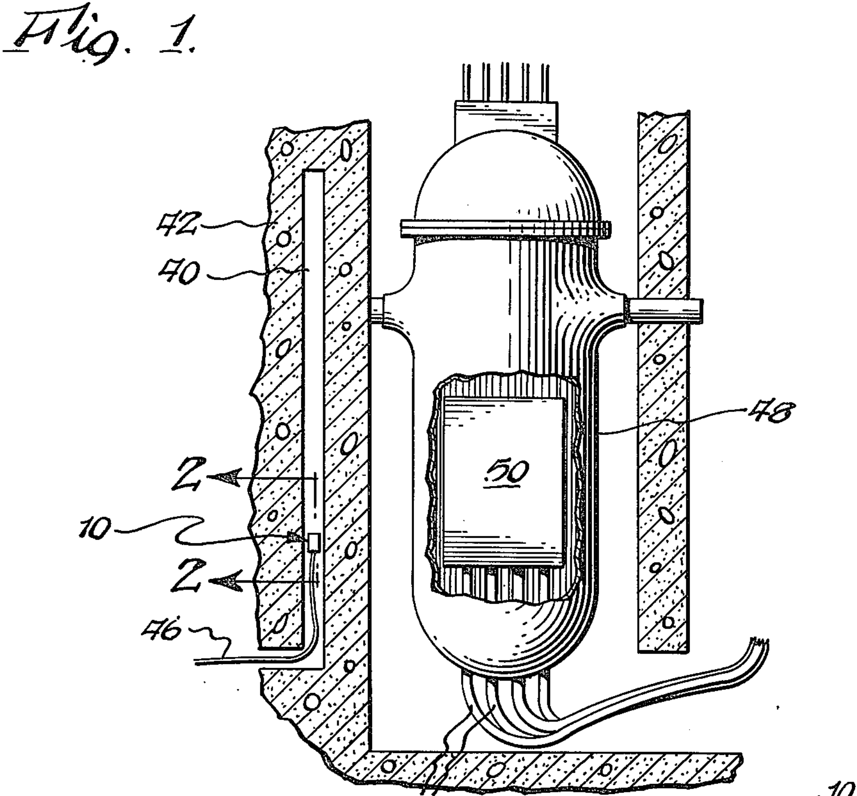
FIG. 1 is an illustration of a typical pressurized water reactor installation showing the location of the ex-core detector instrument 12.

FIG. 1 is a view of a nuclear reactor showing the nuclear reactor pressure vessel 48 with a cut away portion exposing the nuclear core 50. Electrical leads 44 are shown penetrating the pressure vessel and entering the nuclear core 50 in order to service in-core detectors (not shown). As is well known in the nuclear sciences, the fissionable fuel of the nuclear core fissions with the productions of fission products and neutrons as well as the release of energy. This process produces heat and is therefore the heat source or the power source of the nuclear reactor. While many of the neutrons produced in the fission reaction are reabsorbed to promote the chain reaction, a certain small percentage of the generated neutrons leak out of the core and escape through the pressure vessel into the surrounding environment creating an ex-core neutron flux. In order to shield against this ex-core neutron flux, as well as against a high gamma ray flux, the nuclear reactor is surrounded by a biological shield 42 which is ordinarily reinforced concrete or cement.

As previously described in the Background of the Invention, detection of this neutron flux not only gives an indication of reactor power, but also is important to assist in determining the proximity to criticality during reactor start up. For this reason, neutron sensitive ex-core start up detectors, such as indicated at 10, are utilized to detect very small neutron fluxes. A typical arrangement as shown in FIG. 1 includes an ex-core detector 10 positioned in detector well 40. Detector well 40 in biological shield 42 is located external to but parallel with the reactor pressure vessel 48 adjacent to the position of the core 50. The neutron sensitive ex-core detector 10 is preferably placed at one end of the detector well 40 "looking" along the length of the detector well. This orientation is desirable since there is a tendency for the neutrons to be columnated along the axis of the void in the biological shield 42 created by the detector well 40. Thus, due to this columnation effect, the neutrons stream along the void of the detector well, thereby increasing the flux incident upon the detector 10 positioned at one end of the detector well 40.

It is well known that a photomultiplier tube in combination with a scintillator material sensitive to neutrons can be an extremely sensitive neutron detector. However, photomultipliers have not heretofore been utilized in the nuclear reactor environment as neutron detectors due to the problems created by the high temperatures and high radiation fluxes encountered in the nuclear reactor environment. One such problem has been the optical degradation of the optical elements in the photomultiplier-scintillator combination that occurs as a result of the exposure of the device to high energy gamma rays. Normal optical material, such as traditionally used optical glass, darkens with gamma bombardment, thereby reducing the overall efficiency and sensitivity of the photomultiplier tube. In addition, photomultipliers have not heretofore been deemed suitable for use in the nuclear reactor environment due to the excessive background created internally of the photomultiplier detector by the high nuclear radiation fluxes which penetrate the tube. Nuclear radiation will be understood by persons skilled in the field of radiation detectors to include neutrons, alpha particles, beta particles and gammarays. A traditional photomultiplier tube, when subjected to large gamma ray and neutron fluxes, exhibit large background counts in part due to Compton electrons created by the interaction of high energy gamma rays with internal elements having high atomic weights and in part due to radioactive byproducts produced by the interaction of neutrons with internal elements having large neutron cross-sections (such as silver electrical contacts).

Figure 2:
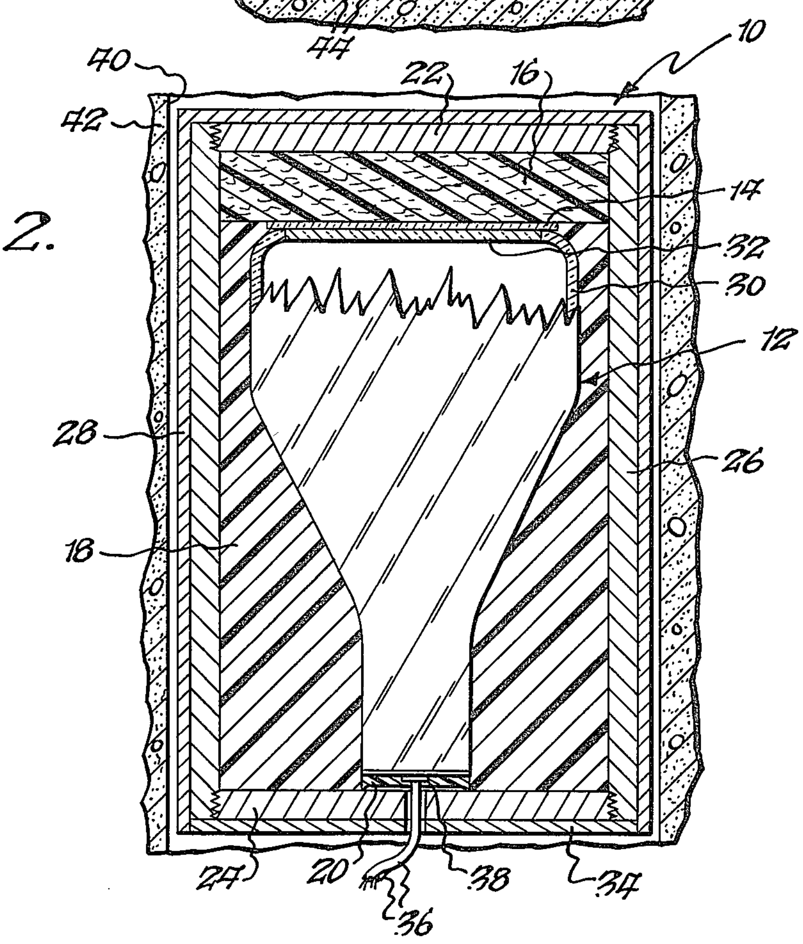
FIG. 2 is a cross-sectional illustration of the neutron detector of the present invention.

FIG. 2 illustrates a photomultiplier tube-based neutron detector 10 for use in the nuclear reactor environment. A traditional commercially available photomultiplier tube 12 is modified by rendering the tube less sensitive to nuclear radiation exposure. In this process, every effort is made to either eliminate or replace internal elements having high neutron cross-sections. One such typical modification is the replacement of the silver electrical contacts with graphite contacts. This type of modification minimizes the interaction between neutrons incident upon the photomultiplier tube and the internal elements of the photomultiplier tube. As a result, radioactive daughter products which may be expected to result from this interaction are also minimized so that radioactive daughter product-created background is kept at a minimum. An additional measure taken to desensitize the photomultiplier tube to high nuclear radiation fluxes is to minimize the usage of materials having high atomic weights thereby minimizing the creation of internally produced Compton electrons resulting from the Compton effect interaction between high energy gamma rays and the nuclei of high atomic weight elements.

The third step taken to desensitize the photomultiplier tube to the damaging effects of high nuclear radiation fluxes is to replace the normal optical glass of the optically transparent end window of the photomultiplier envelope 30 with a radiation darkening resistant end window 32 consisting of optical grade purified fused silica $SiO_2$. Such an end window 32 exhibits little darkening due to gamma damage. A photomultiplier tube as described above can be obtained from the Dumont Corporation.

A neutron responsive scintillator medium 14 is arranged as shown in optical communication with the end window 32 of the photomultiplier tube 12. The scintillator medium preferably is responsive to thermal neutrons and may consist of a cerium doped, lithium-silicate glass scintillator material such as is commercially available from the Nuclear Enterprises Corporation bearing identification No. NE 908. Such a cerium activated lithium-silicate glass scintillator is exceptionally sensitive to thermal neutrons while at the same time being relatively insensitive to gamma rays. In addition, such a scintillator is ideally suited for producing an output which may be subject to pulse height discrimination since the light output ration of thermal neutrons to cobalt 60 gamma rays is approximately 114 to 1. Thus, gamma radiation induced pulses resulting from the scintillator-photomultiplier combination are readily discriminated against by well known discrimination techniques and electronic equipment such as are well known in the detector art. A typical cerium doped lithium-silicate scintillation crystal 14 may have a thickness of from 1 to 2 milimeters and be fastened to the transparent end window 32 of the photomultiplier tube 12 by a temperature and radiation darkening resistant coupling agent such as clear polyurethane material which exhibits little radiation induced darkening.

Adjacent to the thermal neutron responsive scintillator crystal 32 is positioned a neutron thermalizer or moderator 16. Thus, any high energy or "fast" neutrons incident upon the input end of the detector are moderated to "slow" or "thermal" neutrons by the neutron thermalizer 16 prior to passing into the scintillator medium 14. One neutron thermalizer which has been found to be successful in resisting the high temperature and radiation flux environments without significant degradation in performance, is silicone resin. Such a silicone resin neutron moderator 16 may consist of a product commercially available from the Dow Corning Company under Catalog No. Q 12546. This silicone resin is also available from the Synthane-Taylor GFS Company in the form of a fiberglass impregnated silicone resin. This silicone resin impregnated with fiberglass may have a thickness of approximately 1 inch.

The thermalizer medium 16, the scintillation crystal 14 and the photomultiplier tube 12 are surrounded by radiation shielding intended to protect the combination from the high gamma and neutron fluxes which are encountered in the nuclear reactor environment. The shielding includes a lead shield which is opaque to gamma rays comprising lead cylinder 26, and lead end discs 22 and 24. In addition, the radiation shielding includes a neutron shield 18 which absorbs both high and low energy neutrons. Neutron shield 18 is specifically provided to protect the dynode structure of the photomultiplier tube 12 from the damaging effects of neutrons. A borated silicone resin may be used as the neutron absorber 18. More specifically, a boron carbide silicone resin (Dow Corning Q 12546) mixture having a composition of 13 weight percent boron carbide is suitable. The borated silicone resin mixture may be poured and set as indicated at 20 around the electrical connector end 38 of the photomultiplier tube, thereby permitting the electrical lead 36 to exit from the unit in a protected manner. The electrical lead 36 may desirably consist of an integral radiation resistant coaxial cable. Such coaxial cables are readily commercially available.

Finally, as shown in FIG. 2 the entire neutron detector unit is encapsulated in an aluminum container 28 having an aluminum end plate 34 with an outlet therein for passage of the electrical cable 36. The aluminum housing 28 is provided in order to seal the neutron detector from the environment which may include high humidity. Accordingly, aluminum end plate 34 may be provided with a hermetic seal (not shown) which seals the electrical cable 36 in the opending therein and isolates the interior of the housing from the exterior of the housing.

What is claimed is:

1. An Ex-core Startup Neutron Detector for a nuclear reactor comprising:

a. a photomultiplier tube having a radiation darkening resistant end window at an input end and an electrical connector at an output end;

b. a thermal neutron responsive scintillator medium in optical communication with said photomultiplier tube at said input end;

c. a neutron thermalizer adjacent to said scintillator medium whereby neutrons incident upon said neutron thermalizer are thermalized prior to passing into said scintillator medium; and d. radiation shielding at least partially surrounding said photomultiplier tube.

2. The neutron detector of claim 1, wherein said radiation shielding includes a neutron absorber adjacent to at least a portion of said photomultiplier tube away from said input end for shielding said photomultiplier tube from neutrons.

3. The neutron detector of claim 1, wherein said radiation shielding includes a shielding which envelopes said photomultiplier tube and which is opaque to gamma radiations.

4. The neutron detector as recited in claim 3, wherein said enveloping shield comprises lead.

5. The neutron detector as recited in claim 1, wherein said neutron thermalizer includes silicone resin.

6. The neutron detector as recited in claim 1, wherein said scintillator medium includes a cerium-doped lithium silicate scintillation crystal.

7. The neutron detector as recited in claim 2, wherein said neutron absorber includes borated silicone resin.

8. The neutron detector as recited in claim 3, wherein said neutron thermalizer includes silicone resin.

9. The neutron detector as recited in claim 3, further comprising a neutron absorber adjacent to at least a portion of said photomultiplier tube away from said input end for shielding said photomultiplier tube from neutrons.

10. The neutron detector as recited in claim 9, wherein said neutron absorber includes borated silicone resin.

11. The neutron detector as recited in claim 1, wherein said photomultiplier tube is a nuclear radiation insensitive photomultiplier tube.

12. The neutron detector as recited in claim 11, wherein said radiation darkening resistant end window of said photomultiplier input end includes a faceplate consisting of optical grade purified fused silica.

13. The neutron detector as recited in claim 7, wherein said borated silicone resin includes a boron carbide-silicone resin mixture.

14. The neutron detector as recited in claim 5, wherein said neutron thermalizer includes a fiberglass-silicone resin mixture.

15. The neutron detector as recited in claim 6, wherein said neutron thermalizer is a silicone resin.

16. The neutron detector as recited in claim 6, wherein said radiation shielding includes a neutron absorber adjacent to at least a portion of said photomultiplier tube away from said input end for shielding said photomultiplier tube from neutrons.

17. The neutron detector as recited in claim 6, wherein said radiation shielding includes a shielding which envelopes said photomultiplier tube and which is opaque to gamma radiations.

18. The neutron detector as recited in claim 1, wherein said scintillator medium includes a cerium-doped lithium silicate scintillation crystal.

19. The neutron detector as recited in claim 9, wherein said scintillator medium includes a cerium-doped lithium silicate scintillation crystal.

20. An ex-core start up neutron detector for use in a nuclear reactor environment comprising:

a. a closed lead housing opaque to gamma radiation;

b. a nuclear radiation insensitive photomultiplier tube encased within said housing, said photomultiplier tube having an electrical connector at an output end and a radiation darkening resistant end window at an input end including a faceplate consisting of optical grade purified fused silica;

c. a cerium-doped lithium silicate scintillation crystal within said housing responsive to thermalized neutrons in optical communication with said photomultiplier tube to said input end;

d. a silicone resin neutron thermalizer within said housing adjacent to said scintillation crystal whereby neutrons incident on said silicone resin are thermalized prior to passing into said scintillation crystal; and e. a borated silicone resin neutron absorber adjacent to at least a portion of said photomultiplier tube away from said input end for shielding said photomultiplier tube from neutrons.

* * * * *